United States Patent
Roh et al.

(10) Patent No.: US 9,926,814 B2
(45) Date of Patent: Mar. 27, 2018

(54) SUPERCRITICAL CO2 GENERATION SYSTEM

(71) Applicant: DOOSAN HEAVY INDUSTRIES & CONSTRUCTION CO., LTD., Changwon-si, Gyeongsangnam-do (KR)

(72) Inventors: Chul Woo Roh, Siheung-si (KR); Sung Gju Kang, Yongin-si (KR); Jeong Ho Hwang, Yongin-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 107 days.

(21) Appl. No.: 15/002,633

(22) Filed: Jan. 21, 2016

(65) Prior Publication Data
US 2016/0326916 A1  Nov. 10, 2016

(30) Foreign Application Priority Data
May 4, 2015 (KR) .......................... 10-2015-0062435

(51) Int. Cl.
  *F01K 25/10* (2006.01)
  *F02C 1/04* (2006.01)
  *F02C 1/08* (2006.01)
  *F01K 7/32* (2006.01)

(52) U.S. Cl.
  CPC .............. *F01K 25/103* (2013.01); *F01K 7/32* (2013.01); *F02C 1/04* (2013.01); *F02C 1/08* (2013.01)

(58) Field of Classification Search
  CPC .. F01K 25/103; F01K 7/32; F02C 1/08; F02C 1/04

USPC .......................................... 60/650, 682, 684
See application file for complete search history.

(56) References Cited

U.S. PATENT DOCUMENTS

| | | | | |
|---|---|---|---|---|
| 2,960,825 A | * | 11/1960 | Sampietro | F02C 7/105 310/102 R |
| 3,971,211 A | * | 7/1976 | Wethe | F01K 7/32 60/39.181 |
| 2003/0143448 A1 | * | 7/2003 | Keefer | B01D 53/08 429/9 |

(Continued)

FOREIGN PATENT DOCUMENTS

| | | |
|---|---|---|
| JP | 2010261389 A | 11/2010 |
| KR | 10-2014-0064704 A | 5/2014 |
| WO | 2012/074905 A2 | 6/2012 |

*Primary Examiner* — Hoang Nguyen
(74) *Attorney, Agent, or Firm* — Sughrue Mion, PLLC (57) ABSTRACT

A supercritical CO2 generation system including a compressor configured to compress a working fluid; a first heat exchanger that exchanges heat with the working fluid passing through the compressor; a high temperature turbine that expands the working fluid passing through the first heat exchanger and connects to a power generator to produce power; a second heat exchanger that exchanges heat with the working fluid passing through the compressor; a low temperature turbine that expand the working fluid passing through the second heat exchanger and connects to the power generator to produce power; a third heat exchanger between the first heat exchanger and the high temperature turbine that exchanges heat with the working fluid recuperated by the first heat exchanger; and a cooler that cools the working fluid passing through the high temperature turbine and the low temperature turbine and supplies the cooled working fluid to the compressor.

22 Claims, 2 Drawing Sheets

(56) References Cited

U.S. PATENT DOCUMENTS

| | | | | |
|---|---|---|---|---|
| 2007/0157595 A1* | 7/2007 | Lockwood, Jr. | ......... | F02C 1/04 60/39.17 |
| 2011/0179799 A1* | 7/2011 | Allam | .................... | F23M 5/085 60/772 |
| 2011/0302926 A1* | 12/2011 | Hansson | ............... | F01K 21/047 60/772 |

* cited by examiner

SUPERCRITICAL CO2 GENERATION SYSTEM

CROSS-REFERENCE TO RELATED APPLICATION

This application claims priority to Korean Patent Application No. 10-2015-0062435, filed on May 4, 2015, the disclosure of which is incorporated herein by reference in its entirety.

BACKGROUND

Field of the Invention

Exemplary embodiments of the present disclosure relate to a supercritical CO2 generation system, and more particularly, to a supercritical CO2 generation system capable of improving power generation efficiency of a system.

Description of the Related Art

As a necessity to efficiently produce power is increasing more and more and a movement to reduce pollutant emissions is being activated more and more, various attempts to increase power production while reducing the pollutant emissions have been conducted internationally. As one of the attempts, research and development into a power generation system using supercritical CO2 as a working fluid as disclosed in Japanese Patent Laid-Open Publication No. 2012-145092 has been actively conducted.

The supercritical CO2 has a density similar to a liquid state and viscosity similar to gas, such that apparatuses may be miniaturized and power consumption required to compress and circulate a fluid may be minimized. Meanwhile, the supercritical CO2 having critical points of 31.4° C. and 72.8 atmosphere are even lower than water having critical points of 373.95° C. and 217.7 atmosphere and therefore may very easily be handled. The supercritical CO2 generation system shows pure power generation efficiency of about 45% when being operated at 550° C. and has a 20% increase in power generation efficiency compared to the existing steam cycle and reduces a size of a turbo apparatus to a tenth.

However, when the existing supercritical CO2 generation system uses a turbine having high RPM in terms of characteristics of a cycle, an output of the turbine needs to be converted into RPM suitable for a power generator using a torque converter, a gear box, etc., and then transferred. Alternatively, the existing supercritical CO2 generation system needs to convert a frequency of generated power using an inverter, thereby generating a constant output frequency. Therefore, the existing supercritical CO2 generation system is highly likely to lead to a power loss and reduction in efficiency in several parts of the cycle and increase costs due to additional parts and processes.

(Patent Document 1) Japanese Patent Laid-open Publication No. 2012-145092 (Published on Aug. 2, 2012).

SUMMARY

An object of the present disclosure is to provide a supercritical CO2 generation system capable of providing optimum efficiency using a parallel expansion type cascade cycle.

Other objects and advantages of the present invention can be understood by the following description, and become apparent with reference to the embodiments of the present invention. Also, it is obvious to those skilled in the art to which the present disclosure pertains that the objects and advantages of the present disclosure can be realized by the means as claimed and combinations thereof.

In accordance with one aspect of the present disclosure, a supercritical CO2 generation system includes: a compressor configured to compress a working fluid; a first heat exchanger configured to exchange heat with the working fluid passing through the compressor; a high temperature turbine configured to expand the working fluid passing through the first heat exchanger and to be connected to a power generator to produce power; a second heat exchanger configured to exchange heat with the working fluid passing through the compressor; a low temperature turbine configured to expand the working fluid passing through the second heat exchanger and to be connected to the power generator to produce power; a third heat exchanger configured to be provided between the first heat exchanger and the high temperature turbine to exchange heat with the working fluid recuperated by the first heat exchanger; and a cooler configured to cool the working fluid passing through the high temperature turbine and the low temperature turbine and supply the cooled working fluid to the compressor.

A flow of the working fluid may be divided into a first flow and a second flow at a rear portion of the compressor and the first flow may be introduced from the compressor into the first heat exchanger.

The second heat exchanger may be recuperated by being introduced with the second flow of the working fluid.

When the working fluid is supplied from the second heat exchanger, the low temperature turbine may transfer a driving force to the generator and when the working fluid is not supplied from the second heat exchanger, may not transfer the driving force to the power generator.

Any one of the high temperature turbine and the low temperature turbine may be formed on a hollow shaft and the other one thereof may be formed on a shaft which is inserted into the hollow shaft.

The shaft of the high temperature turbine may be connected to one side of the power generator to transfer a driving force to the power generator and the shaft of the low temperature turbine may be connected to the other side of the power generator to transfer the driving force to the power generator.

The first heat exchanger and the second heat exchanger may be a recuperator recuperating the working fluid.

The third heat exchanger may deliver waste heat recovered from an external heat source to the working fluid.

The working fluid passing through the high temperature turbine may be delivered to the cooler through the second heat exchanger and the working fluid of the second flow may be recuperated by receiving heat from the working fluid passing through the second heat exchanger.

The working fluid passing through the low temperature turbine may be delivered to the cooler through the first heat exchanger and the working fluid of the first flow may be recuperated by receiving heat from the working fluid passing through the first heat exchanger.

The flow of the working fluid may further include a third flow divided at the rear portion of the compressor.

The supercritical CO2 generation system may further include: a fourth heat exchanger configured to be recuperated by being introduced with the third flow of the working fluid; and a medium temperature turbine configured to be connected to the power generator to produce power, in which the working fluid passing through the fourth heat exchanger may be delivered to the medium temperature turbine.

The working fluid passing through the high temperature turbine may be delivered to the cooler through the second heat exchanger and the working fluid of the second flow may be recuperated by receiving heat from the working fluid passing through the second heat exchanger.

The working fluid passing through the low temperature turbine may be delivered to the cooler through the first heat exchanger and the working fluid of the first flow may be recuperated by receiving heat from the working fluid passing through the first heat exchanger.

The working fluid passing through the medium temperature turbine may be delivered to the cooler through the third heat exchanger and the working fluid of the third flow may be recuperated by receiving heat from the working fluid passing through the fourth heat exchanger.

In accordance with another aspect of the present disclosure, a supercritical $CO_2$ generation system includes: a compressor configured to compress a working fluid; a first heat exchanger configured to exchange heat with the working fluid of a first flow distributed at a rear portion of the compressor; a high temperature turbine configured to expand the working fluid passing through the first heat exchanger and to be connected to a power generator to produce power; a second heat exchanger configured to exchange heat with the working fluid of a second flow distributed at the rear portion of the compressor; a low temperature turbine configured to expand the working fluid passing through the second heat exchanger and to be connected to the power generator to produce power; and a cooler configured to cool the working fluid passing through the high temperature turbine and the low temperature turbine and supply the cooled working fluid to the compressor.

A flow of the working fluid may be divided into a first flow and a second flow at the rear portion of the compressor and the first flow may be introduced from the compressor into the first heat exchanger, the second heat exchanger may be recuperated by being introduced with the second flow of the working fluid, when the working fluid is supplied from the second heat exchanger, the low temperature turbine may transfer a driving force to the generator and when the working fluid is not supplied from the second heat exchanger, may not transfer the driving force to the power generator, and any one of the high temperature turbine and the low temperature turbine may be formed on a hollow shaft and the other one thereof may be formed on a shaft which is inserted into the hollow shaft.

A flow of the working fluid may be divided into a first flow and a second flow at the rear portion of the compressor and the first flow may be introduced from the compressor into the first heat exchanger, the second heat exchanger may be recuperated by being introduced with the second flow of the working fluid, when the working fluid is supplied from the second heat exchanger, the low temperature turbine may transfer a driving force to the generator and when the working fluid is not supplied from the second heat exchanger, may not transfer the driving force to the power generator, and the shaft of the high temperature turbine may be connected to one side of the power generator to transfer a driving force to the power generator and the shaft of the low temperature turbine may be connected to the other side of the power generator to transfer the driving force to the power generator.

The fourth heat exchanger may be a recuperator recuperating the working fluid.

The supercritical $CO_2$ generation system may further include: a distributor configured to be provided at the rear portion of the compressor to divide the flow of the working fluid into the first flow to the third flow.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Hereinafter, a supercritical $CO_2$ generation system according to an exemplary embodiment of the present disclosure will be described in detail with reference to the accompanying drawings.

Generally, the supercritical $CO_2$ generation system configures a close cycle in which $CO_2$ used for power generation is not emitted to the outside and uses supercritical $CO_2$ as a working fluid.

The supercritical $CO_2$ generation system uses the $CO_2$ as the working fluid and therefore may use exhaust gas emitted from a thermal power plant, etc., such that it may be used in a single generation system and a hybrid generation system with a thermal generation system. The working fluid of the supercritical $CO_2$ generation system may also supply $CO_2$ which the $CO_2$ separating from the exhaust gas and may also supply separate $CO_2$.

The $CO_2$ within the cycle passes through a compressor and then is heated while passing through a heat source such as a heater to be in a high temperature and pressure supercritical state and a supercritical $CO_2$ fluid drives a turbine. The turbine is connected to a power generator and the power generator is driven by the turbine to produce power. The $CO_2$ used to produce power is cooled while passing through a heat exchanger and the cooled working fluid is again supplied to the compressor and is circulated within the cycle. The turbine or the heat exchanger may be provided in plural.

The present disclosure proposes a supercritical $CO_2$ generation system capable of improving efficiency of the system by applying a cascade cycle, in which the turbines which are a plurality of expansion apparatuses are applied in parallel, to the basic supercritical $CO_2$ generation system.

The supercritical $CO_2$ generation system according to various exemplary embodiments is used as a meaning including the system that all the working fluids flowing within the cycle are in the supercritical state and the system that most of the working fluids are in the supercritical state and the rest of the working fluids are in a subcritical state.

Further, according to various exemplary embodiments, the $CO_2$ is used as the working fluid. Here, the $CO_2$ is used as a meaning including pure $CO_2$ in a chemical meaning, $CO_2$ somewhat including impurities in general terms, and a fluid in a state in which more than one fluid as additives is mixed with $CO_2$.

Figure 1:
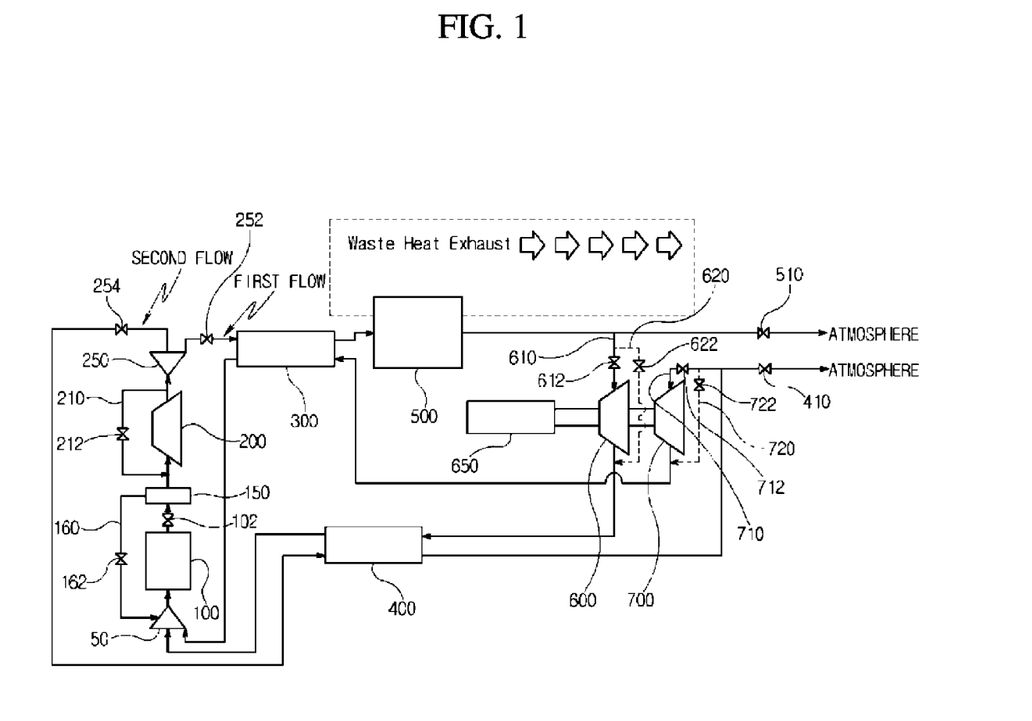
FIG. 1 is a block diagram illustrating a supercritical $CO_2$ generation system according to a first exemplary embodiment.

FIG. 1 is a block diagram illustrating a supercritical CO2 generation system according to a first exemplary embodiment of the present disclosure.

As illustrated in FIG. 1, the supercritical CO2 generation system according to the first exemplary embodiment may include a compressor 200 using CO2 as a working fluid and compressing the working fluid, a first heat exchanger 300 exchanging heat with some of the working fluid passing through the compressor 200, a high temperature turbine 600 driven by the working fluid passing through the first heat exchanger 300, a second heat exchanger 400 exchanging heat with the rest of the working fluid passing through the compressor 200, a low temperature turbine 700 driven by the working fluid passing through the second heat exchanger 400, a cooler 100 cooling the working fluid passing through the high temperature turbine 600 and the low temperature turbine 700 before the working fluid is introduced into the compressor 200, and a third heat exchanger 500 re-heating the working fluid passing through the first heat exchanger 300.

Each of the components is connected to each other by a transfer tube and unless specially mentioned, it is to be understood that the working fluid flows along the transfer tube. However, when a plurality of components is integrated, there may be parts and regions actually serving as the transfer tube within the integrated components. Even in the case, it is to be understood that the working fluid may flows along the transfer tube. A channel performing a separate function will be described additionally.

The high temperature turbine 600 and the low temperature turbine 700 are driven by the working fluid to drive a power generator 650 connected at least one of the turbines, thereby generating power. The high temperature turbine 600 and the low temperature turbine 700 may serve as an expander because the working fluid is expanded while passing through the high temperature 600 and the low temperature turbine 700.

Here, the high temperature turbine 600 and the low temperature turbine 700 are terms having a relative meaning to each other and therefore, it is to be noted that that they are not understood as having the meaning that temperature higher than a specific temperature as a reference value is a high temperature and temperature lower than that is a low temperature.

A detailed configuration of the supercritical CO2 generation system according to the first exemplary embodiment having the above configuration will be described in more detail.

The working fluid in a gas state introduced into a cooler 100 undergoes a phase change into a liquid state while being cooled. A front portion of the cooler 100 may be provided with a first header 50 which additionally supplies the working fluid or introduces the working fluid through the high temperature turbine 600 or the low temperature turbine 700 into the cooler 100. The first header 50 serves as a kind of distributor or a working fluid supplier. A rear portion of the cooler 100 is provided with a cooler flow control valve 102 and controls a flow rate of a liquefied working fluid introduced into a flash tank 150.

When the supercritical CO2 generation system according to the exemplary embodiment of the present disclosure is configured of a Rankine cycle, the working fluid undergoes the phase change between a liquid state and a gas state and the flash tank 150 is configured to prevent the liquefied working fluid from reflowing toward the cooler 100. The front portion of the cooler 100 and the flash tank 150 may be connected to each other by a tank circulation bypass line 160 and a tank circulation control valve 162 may be installed on the tank circulation bypass line 160. If the tank circulation control valve 162 is opened, the working fluid remaining in the gas state without being liquefied is delivered to the cooler 100 over the tank circulation bypass line 160. The liquefied working fluid through the flash tank 150 is compressed at a high pressure by the compressor 200.

The high pressure working fluid compressed by the compressor 200 may be divided into two flows at a rear portion of the compressor 200. The flow of the working fluid is divided into a first flow which is delivered to the first heat exchanger 300 and a second flow which is delivered to the second heat exchanger 400 through a second header 250 provided at the rear portion of the compressor 200.

A distribution of the flow rate of the working fluid by the second header 250 may be set in advance in a system design in consideration of a limitation of a heat transfer quantity and a difference in the flow rate and enthalpy. For example, a ratio of the first flow delivered to the high temperature turbine 600 and the second flow delivered to the low temperature turbine 700 may be set to be 60:40. However, flow rate distribution setting of the working fluid may be changed depending on a heat energy inflow rate from the outside, a change amount in outside temperature, whether the system is in a starting state or a driving state, etc. A standard of additional flow rate distribution may include which one of the heat exchangers is a main heat exchanger absorbing waste heat and the flow rate of the working fluid delivered to the main heat exchanger may be set to be increased.

The first flow is delivered to the first heat exchanger 300 when a first flow rate control valve 252 installed on the transfer tube connected to the first heat exchanger 300 is opened. The second flow is delivered to the second heat exchanger 400 when a second flow rate control valve 254 installed on the transfer tube connected to the second heat exchanger 400 is opened.

The working fluid circulated along the first flow is recuperated and heated by the first heat exchanger 300 and the third heat exchanger 500 and then is expanded by the high temperature turbine 600 and is again circulated to the cooler 100 through the second heat exchanger 400.

The working fluid circulated along the second flow is recuperated by the second heat exchanger 400 and then is expanded by the low temperature turbine 700 and is again circulated to the cooler 100 through the first heat exchanger 300.

Here, the first heat exchanger 300 is a low temperature recuperator recuperating the working fluid and the second heat exchanger 400 is a high temperature recuperator recuperating the working fluid. Here, the low temperature and the high temperature means that the first heat exchanger 300 is a relatively low temperature compared to the second heat exchanger 400 and the second heat exchanger 400 is a relatively high temperature compared to the first heat exchanger 300.

The third heat exchanger 500 receives heat from the heat source and transfers the heat to the working fluid of the supercritical CO2 generation system according to various exemplary embodiments. Here, the heat source may include facilities, equipments, etc., which emit waste heat of, for example, a steel plant, a chemical plant, a power plant, a fuel delivery line, etc., and the third heat exchanger 500 may be configured to have a structure appropriate to receive heat from various heat sources in addition to the heat sources.

Meanwhile, a compressor circulation line 210 may be connected from the rear portion of the compressor 200 to the front portion of the compressor 200 and a compressor circulation valve 212 may be provided on the compressor circulation line 210. The working fluid passing through the compressor 200 may be bypassed toward the front portion of the compressor 200 without flowing toward the first heat exchanger 300 by the compressor circulation valve 212. The compressor circulation valve 212 is opened at the time of the initial starting of the system (initial starting of the compressor) and serves to circulate the working fluid before the working fluid is warmed up enough to drive the turbine. Further, the compressor circulation valve 212 also serves as a safety valve in an emergency.

The working fluid compressed by the compressor 200 and then recuperated by the first heat exchanger 300 along the first flow is heated through the third heat exchanger 500 and then is delivered to the high temperature turbine 600.

A working fluid transfer tube 610 connected from the third heat exchanger 500 to the high temperature 600 side may be provided with a high pressure control valve 612 to control the flow rate of the working fluid supplied to the high temperature turbine 600.

When the pressure of the working fluid introduced into the high temperature turbine 600 is too high, an exhaust valve 510 serving as the safety valve to exhaust the working fluid to the outside of the cycle may be provided.

Further, a high temperature turbine bypass line 620 connected from a front portion of the high pressure control valve 612 to a rear portion of the high temperature turbine 600 may be provided and a bypass valve 622 is installed on the high temperature turbine bypass line 620. The working fluid may also be supplied to the high temperature turbine 600 depending on the opened and closed state of the high pressure control valve 612 and the bypass valve 622 and may also be immediately delivered to the second heat exchanger 400 while bypassing the high temperature turbine 600.

As such, the working fluid passing through the high temperature turbine 600 is introduced into the second heat exchanger 400 and is used to recuperate the working fluid introduced into the second heat exchanger 400 along the second flow. Next, the working fluid of which the heat is lost by the second heat exchanger 400 is again introduced into the cooler 100 through the first header 50.

Meanwhile, the working fluid compressed by the compressor 200 and then recuperated by the second heat exchanger 400 along the second flow is delivered to the low temperature turbine 700. A working fluid transfer tube 710 connected from the second heat exchanger 400 to the low temperature 700 side may be provided with a low pressure control valve 712 to control the flow rate of the working fluid supplied to the low temperature turbine 700.

When the pressure of the working fluid introduced into the low temperature turbine 700 is too high, the exhaust valve 410 serving as the safety valve to exhaust the working fluid to the outside of the cycle may be provided.

Further, a low temperature turbine bypass line 720 connected from a front portion of the low pressure control valve 712 to a rear portion of the low temperature turbine 700 may be provided and a bypass valve 722 is installed on the low temperature turbine bypass line 720. The working fluid may also be supplied to the low temperature turbine 700 depending on the opened and closed state of the low pressure control valve 712 and the bypass valve 722 and may also be immediately delivered to the first heat exchanger 300 while bypassing the low temperature turbine 700.

The working fluid passing through the low temperature turbine 700 is introduced into the first heat exchanger 300 and is used to recuperate the working fluid introduced into the first heat exchanger 300 along the first flow. Next, the working fluid of which the heat is lost by the first heat exchanger 300 is again introduced into the cooler 100 through the first header 50.

According to the first exemplary embodiment, both of the high temperature turbine 600 and the low temperature turbine 700 are connected to the power generator 650 and rotate to drive the power generator 650, thereby producing power. However, when the working fluid is not introduced into the low temperature turbine 700, the low temperature turbine 700 does not entirely contribute to the driving of the power generator but may serve only as a rotating resistance of the high temperature turbine 600.

Therefore, according to a first modified example of the first exemplary embodiment, any one of the high temperature turbine 600 and the low temperature turbine 700 is formed on a hollow shaft and the other thereof is formed on a shaft (hereinafter, referred to as an insertion shaft) which is inserted into the hollow shaft, in which the hollow shaft and the insertion shaft may each be connected to the power generator 650. In this case, there is an advantage in that even though only any one of the turbines is operated, the power generator 650 may be driven and the other thereof which is not operated does not act as the rotating resistance against the driving of the power generator.

Further, according to a second modified example of the first exemplary embodiment, the shaft of the power generator 650 may adopt a structure in which the shaft of the high temperature turbine 600 and the shaft of the low temperature turbine 700 are separately intermittent. For example, gears are formed in some sections of outer side surfaces of three shafts, and it may be assumed that a gear formed on the shaft of the high temperature turbine 600 is engaged with one side of a gear formed on the shaft of the power generator 650, and a gear formed on the shaft of the low temperature turbine 700 is engaged at the same side of the power generator 650.

Further, according to a second modified example of the first exemplary embodiment, as the structure of intermittently coupling three shafts with one another, various power connection structures such as a belt structure and a chain structure in addition to the gear structure may be used. That is, a clutch having various structures may be used to smoothly perform the intermittent process of each shaft.

Like the first modified example, the second modified example has an advantage in that even though only any one of the turbines is operated, the power generator 650 may be driven and the other thereof which is not operated does not act as the rotating resistance against the driving of the power generator.

Further, in the first modified example and the second modified example of the first exemplary embodiment, if it is assumed that both of the shaft of the high temperature turbine 600 and the shaft of the low temperature turbine 700 are connected to the shaft of the power generator 650 to transfer a driving force, the shaft of the power generator 650 receives the driving force from two different shafts, respectively. Therefore, compared to the case in which the shaft of the power generator 650 receives a large driving force from one shaft, the shaft of the power generator 650 may adopt the structures of the first modified example and the second modified example to remarkably reduce a torsion fatigue stress accumulated on the shaft of the power generator 650 and rupture possibility thereof due to the torsion fatigue stress.

Further, the shaft of the high temperature turbine 600 and the shaft of the low temperature turbine 700 each bear a driving torque which needs to be transferred to the shaft of the power generator 650. Therefore, compared to the case in which only one shaft of the turbine needs to transfer a large driving force to the shaft of the power generator 650, the torsion fatigue stress accumulated on the shaft of the high temperature turbine 600 and the shaft of the low temperature turbine 700 and the rupture possibility thereof due to the torsion fatigue stress may be remarkably reduced.

In particular, when the cycle is quickly operated, the shutdown and the driving restarting of the cycle are repeated, and the RPM and the output are quickly changed, the above effects are more remarkable.

The supercritical CO2 generation system to which the cascade cycle in which the two turbines which are the expansion apparatus are provided in parallel is applied is described above. Hereinafter, the supercritical CO2 generation system including three expansion apparatuses will be described below (the same components as the first exemplary embodiment is denoted by the same reference numerals and the overlapping description thereof will be omitted).

Figure 2:
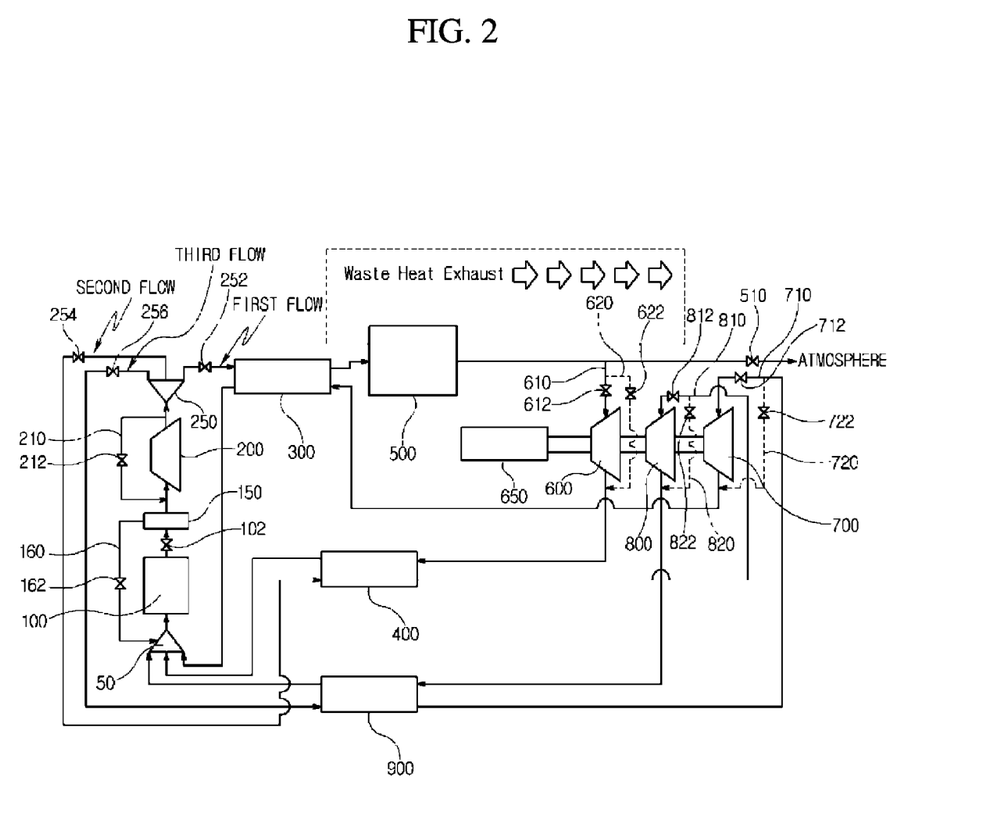
FIG. 2 is a block diagram illustrating a supercritical $CO_2$ generation system according to a second exemplary embodiment.

FIG. 2 is a block diagram illustrating a supercritical CO2 generation system according to a second exemplary embodiment.

As illustrated in FIG. 2, in the supercritical CO2 generation system according to the second exemplary embodiment, the working fluid from the second header 250 of the rear portion of the compressor 200 is distributed by being divided into the first to third flows. Three turbines such as the high temperature turbine 600, a medium temperature turbine 800, and the low temperature turbine 700 may be provided and a fourth heat exchanger 900 may be additionally provided.

When the first flow rate control valve 252 is opened, the first flow is delivered to the first heat exchanger 300. The working fluid is recuperated by the first heat exchanger 300 and is heated by the third heat exchanger 500 and then is delivered to the high temperature turbine 600. The working fluid expanded by the high temperature turbine 600 is delivered to the second heat exchanger 400 and the heat of the working fluid passing through the high temperature turbine 600 is used in the second heat exchanger 400 to recuperate the working fluid of the second flow. Next, the working fluid passing through the high temperature turbine 600 and the second heat exchanger 400 is again circulated to the cooler 100 through the first header 50.

When the second flow rate control valve 254 is opened, the second flow is delivered to the second heat exchanger 400. The working fluid is recuperated by the second heat exchanger 400 and then is delivered to the medium temperature turbine 800. The working fluid expanded by the medium temperature turbine 800 is delivered to the fourth heat exchanger 900 and the heat of the working fluid passing through the medium temperature turbine 800 is used in the second heat exchanger 900 to recuperate the working fluid of the third flow. Next, the working fluid passing through the medium temperature turbine 800 and the fourth heat exchanger 900 is again circulated to the cooler 100 through the first header 50.

The third flow is delivered to the fourth heat exchanger 900 when the third flow rate control valve 256 installed on the transfer tube connected to the fourth heat exchanger 900 is opened. The working fluid circulated along the third flow is recuperated by the fourth heat exchanger 900 and then is delivered to the low temperature turbine 700. The working fluid expanded by the low temperature turbine 700 is delivered to the first heat exchanger 300 and the heat of the working fluid passing through the low temperature turbine 700 is used in the second heat exchanger 300 to recuperate the working fluid of the first flow. Next, the working fluid passing through the low temperature turbine 700 and the first heat exchanger 300 is again circulated to the cooler 100 through the first header 50.

Here, the first heat exchanger 300 is the low temperature recuperator recuperating the working fluid and the second heat exchanger 400 is the high temperature recuperator recuperating the working fluid. The fourth heat exchanger 900 is the medium temperature recuperator recuperating the working fluid. Here, the low temperature, the medium temperature, and the high temperature means that the first heat exchanger 300 or the fourth heat exchanger 900 is the relatively low temperature or medium temperature compared to the second heat exchanger 400 and the second heat exchanger 400 is the relatively high temperature compared to the first heat exchanger 300 and the fourth heat exchanger 900.

Meanwhile, a working fluid transfer tube 810 connected from the second heat exchanger 400 to the medium temperature 800 side may be provided with a medium pressure control valve 812 to control the flow rate of the working fluid supplied to the medium temperature turbine 800. When the pressure of the working fluid introduced into the medium temperature turbine 800 is too high, the exhaust valve (not illustrated) serving as the safety valve to exhaust the working fluid to the outside of the cycle may be provided. However, for convenience, the present exemplary embodiment describes the example in which the exhaust valve is not provided.

Further, a medium temperature turbine bypass line 820 connected from a front portion of the medium pressure control valve 812 to a rear portion of the medium temperature turbine 800 may be provided and a bypass valve 822 is installed on the medium temperature turbine bypass line 820. The working fluid may also be supplied to the medium temperature turbine 800 depending on the opened and closed state of the medium pressure control valve 812 and the bypass valve 822 and may also be immediately delivered to the fourth heat exchanger 900 while bypassing the medium temperature turbine 800.

According to the second exemplary embodiment, all of the high temperature turbine 600, the medium temperature turbine 800, and the low temperature turbine 700 are connected to the power generator 650 and rotate to drive the power generator 650, thereby producing power. However, when the working fluid is not introduced into the medium temperature turbine 800 and the low temperature turbine 700, the medium temperature turbine 800 and the low temperature turbine 700 do not entirely contribute to the driving of the power generator but may serve only as the rotating resistance of the high temperature turbine 600.

Therefore, according to a first modified example of the second exemplary embodiment, any one of the high temperature turbine 600, the medium temperature turbine 800, and the low temperature turbine 700 is formed on the hollow shaft (hereinafter, referred to as a first hollow shaft). One of the remaining two turbines is formed on the hollow shaft (hereinafter, referred to as a second hollow shaft) which is inserted into the first hollow shaft. The remaining one turbine is formed on the shaft (hereinafter, referred to as a third shaft) which is inserted into the second hollow shaft. The first hollow shaft, the second hollow shaft, and the third shaft may each be connected to the power generator 650. In this case, there is an advantage in that even though only any one of the turbines is operated, the power generator 650 may be driven and one or two turbines thereof which are not operated do not act as the rotating resistance against the driving of the power generator.

Further, according to a second modified example of the second exemplary embodiment, the shaft of the power generator 650 may also adopt a structure in which the shaft of the high temperature turbine 600, the shaft of the medium temperature turbine 800, and the shaft of the low temperature turbine 700 are separately intermittent. For example, gears may be formed in at least some sections of outer side surfaces of the four shafts. Further, the gear formed on the shaft of the high temperature turbine 600 may be engaged with a first side of the gear formed on the shaft of the power generator 650. Further, it may be assumed that the gear formed on the shaft of the medium temperature turbine 800 is engaged with a second shaft of the gear formed on the shaft of the power generator 650 and the gear formed on the shaft of the low temperature turbine 700 is engaged with a third side of the gear formed on the shaft of the power generator 650. Further, according to the second modified example, as the structure of intermittently coupling four shafts with one another, various power connection structures such as the belt structure and the chain structure in addition to the gear structure may be used. Further, the clutch having various structures may be used to smoothly perform the intermittent process of each shaft. Like the first modified example, the second modified example has an advantage in that even though only any one of the turbines is operated, the power generator 650 may be driven and one or two turbines thereof which are not operated do not act as the rotating resistance against the driving of the power generator.

Further, in the first modified example and the second modified example of the second exemplary embodiment, if it is assumed that both of the shaft of the high temperature turbine 600 and the shaft of the medium temperature turbine 800 are connected to the shaft of the power generator 650 to transfer the driving force, the shaft of the power generator 650 receives the driving force from three different shafts, respectively. Therefore, compared to the case in which the shaft of the power generator 650 receives the large driving force from one shaft, the shaft of the power generator 650 may adopt the structures of the first modified example and the second modified example to remarkably reduce the torsion fatigue stress accumulated on the shaft of the power generator 650 and the rupture possibility thereof due to the torsion fatigue stress. Further, the shaft of the high temperature turbine 600, the shaft of the medium temperature turbine 800 each bear the driving torque which needs to be transferred to the shaft of the power generator 650. Therefore, compared to the case in which only one shaft of the turbine needs to transfer the large driving force to the shaft of the power generator 650, the torsion fatigue stress accumulated on the shaft of the high temperature turbine 600, the shaft of the medium temperature turbine 800, and the shaft of the low temperature turbine 700 and the rupture possibility thereof due to the torsion fatigue stress may be remarkably reduced.

In particular, when the cycle is quickly operated, the shutdown and the driving restarting of the cycle are repeated, and the RPM and the output are quickly changed, the above effects are more remarkable.

Meanwhile, in the supercritical CO2 generation system according to various exemplary embodiments, even when the RPM of one or more turbine is changed, the power generator may produce electricity having a uniform frequency and a transmission may be installed between the rotating shaft of one or more turbine and the rotating shaft of the power generator 650.

Further, according to various exemplary embodiments, the working fluids at the outlet sides of the turbines may be sequentially recuperated, thereby improving the overall efficiency of the system.

The various exemplary embodiments of the present invention, which is described as above and shown in the drawings, should not be interpreted as limiting the technical spirit of the present invention. The scope of the present invention is limited only by matters set forth in the claims and those skilled in the art can modify and change the technical subjects of the present invention in various forms. Therefore, as long as these improvements and changes are apparent to those skilled in the art, they are included in the protective scope of the present invention.

What is claimed is:
1. A supercritical CO2 generation system, comprising:
a compressor configured to compress a working fluid;
a first heat exchanger configured to exchange heat with the working fluid passing through the compressor;
a high temperature turbine configured to expand the working fluid passing through the first heat exchanger and to be connected to a power generator to produce power;
a second heat exchanger configured to exchange heat with the working fluid passing through the compressor;
a low temperature turbine configured to expand the working fluid passing through the second heat exchanger and to be connected to the power generator to produce power, wherein a temperature of the high temperature turbine is higher than a temperature of the low temperature turbine;
a third heat exchanger configured to be provided between the first heat exchanger and the high temperature turbine to exchange heat with the working fluid recuperated by the first heat exchanger; and
a cooler configured to cool the working fluid passing through the high temperature turbine and the low temperature turbine and supply the cooled working fluid to the compressor,
wherein the first heat exchanger is configured to exchange heat between first working fluid output from the low temperature turbine and second working fluid output from the cooler.

2. The supercritical CO2 generation system of claim 1, wherein a flow of the working fluid is divided into a first flow and a second flow at a rear portion of the compressor and the first flow is introduced from the compressor into the first heat exchanger.

3. The supercritical CO2 generation system of claim 2, wherein the second heat exchanger is recuperated by being introduced with the second flow of the working fluid.

4. The supercritical CO2 generation system of claim 3, wherein when the working fluid is supplied from the second heat exchanger, the low temperature turbine transfers a driving force to the power generator and when the working fluid is not supplied from the second heat exchanger, the low temperature turbine does not transfer the driving force to the power generator.

5. The supercritical CO2 generation system of claim 4, wherein one of the high temperature turbine or the low temperature turbine is formed on a hollow shaft and the other one thereof is formed on a shaft which is inserted into the hollow shaft.

6. The supercritical CO2 generation system of claim 4, wherein a shaft of the high temperature turbine is connected to one side of the power generator to transfer a driving force to the power generator and a shaft of the low temperature turbine is connected to the one side of the power generator to transfer the driving force to the power generator.

7. The supercritical CO2 generation system of claim 6, wherein the first heat exchanger and the second heat exchanger each function as a recuperator for recuperating the working fluid.

8. The supercritical CO2 generation system of claim 7, wherein the third heat exchanger delivers waste heat recovered from an external heat source to the working fluid.

9. The supercritical CO2 generation system of claim 8, wherein the working fluid passing through the high temperature turbine is delivered to the cooler through the second heat exchanger and the working fluid of the second flow is recuperated by receiving heat from the working fluid passing through the second heat exchanger.

10. The supercritical CO2 generation system of claim 8, wherein the working fluid passing through the low temperature turbine is delivered to the cooler through the first heat exchanger and the working fluid of the first flow is recuperated by receiving heat from the working fluid passing through the first heat exchanger.

11. The supercritical CO2 generation system of claim 3, wherein the flow of the working fluid further includes a third flow divided at the rear portion of the compressor.

12. The supercritical CO2 generation system of claim 11, further comprising:
a fourth heat exchanger configured to be recuperated by being introduced with the third flow of the working fluid; and
a medium temperature turbine configured to be connected to the power generator to produce power,
wherein the working fluid passing through the fourth heat exchanger is delivered to the medium temperature turbine, wherein a temperature of the medium temperature turbine is between the temperature of the high temperature turbine and the temperature of the low temperature turbine.

13. The supercritical CO2 generation system of claim 12, wherein the working fluid passing through the high temperature turbine is delivered to the cooler through the second heat exchanger and the working fluid of the second flow is recuperated by receiving heat from the working fluid passing through the second heat exchanger.

14. The supercritical CO2 generation system of claim 12, wherein the working fluid passing through the low temperature turbine is delivered to the cooler through the first heat exchanger and the working fluid of the first flow is recuperated by receiving heat from the working fluid passing through the first heat exchanger.

15. The supercritical CO2 generation system of claim 12, wherein the working fluid passing through the medium temperature turbine is delivered to the cooler through the third heat exchanger and the working fluid of the third flow is recuperated by receiving heat from the working fluid passing through the fourth heat exchanger.

16. A supercritical CO2 generation system, comprising:
a compressor configured to compress a working fluid;
a first heat exchanger configured to exchange heat with the working fluid of a first flow distributed at a rear portion of the compressor;
a high temperature turbine configured to expand the working fluid passing through the first heat exchanger and to be connected to a power generator to produce power;
a second heat exchanger configured to exchange heat with the working fluid of a second flow distributed at the rear portion of the compressor;
a low temperature turbine configured to expand the working fluid passing through the second heat exchanger and to be connected to the power generator to produce power, wherein a temperature of the high temperature turbine is higher than a temperature of the low temperature turbine; and
a cooler configured to cool the working fluid passing through the high temperature turbine and the low temperature turbine and supply the cooled working fluid to the compressor,
wherein the first heat exchanger is configured to exchange heat between first working fluid output from the low temperature turbine and second working fluid output from the cooler.

17. The supercritical CO2 generation system of claim 16, wherein a flow of the working fluid is divided into a first flow and a second flow at the rear portion of the compressor and the first flow is introduced from the compressor into the first heat exchanger,
the second heat exchanger is recuperated by being introduced with the second flow of the working fluid,
when the working fluid is supplied from the second heat exchanger, the low temperature turbine transfers a driving force to the power generator and when the working fluid is not supplied from the second heat exchanger, the low temperature turbine does not transfer the driving force to the power generator, and
one of the high temperature turbine or the low temperature turbine is formed on a hollow shaft and the other one thereof is formed on a shaft which is inserted into the hollow shaft.

18. The supercritical CO2 generation system of claim 16, wherein a flow of the working fluid is divided into a first flow and a second flow at the rear portion of the compressor and the first flow is introduced from the compressor into the first heat exchanger,
the second heat exchanger is recuperated by being introduced with the second flow of the working fluid,
when the working fluid is supplied from the second heat exchanger, the low temperature turbine transfers a driving force to the power generator and when the working fluid is not supplied from the second heat exchanger, the low temperature turbine does not transfer the driving force to the power generator, and
a shaft of the high temperature turbine is connected to one side of the power generator to transfer a driving force to the power generator and a shaft of the low temperature turbine is connected to the one side of the power generator to transfer the driving force to the power generator.

19. The supercritical CO2 generation system of claim 12, wherein the fourth heat exchanger is a recuperator recuperating the working fluid.

20. The supercritical CO2 generation system of claim 19, further comprising:
a distributor provided at the rear portion of the compressor and configured to divide the flow of the working fluid into the first flow, the second flow, and the third flow.

21. The supercritical CO2 generation system of claim 1, wherein the first heat exchanger is configured to exchange the heat between the first working fluid and the second working fluid before third working fluid output from the first heat exchanger is supplied to the high temperature turbine.

22. The supercritical CO2 generation system of claim 16, wherein the first heat exchanger is configured to exchange the heat between the first working fluid and the second working fluid before third working fluid output from the first heat exchanger is supplied to the high temperature turbine.

* * * * *